(12) United States Patent
Wojdala et al.

(10) Patent No.: US 9,965,900 B2
(45) Date of Patent: May 8, 2018

(54) PERSONALIZED VIDEO-BASED AUGMENTED REALITY

(71) Applicant: Avid Technology, Inc., Burlington, MA (US)

(72) Inventors: Andrzej Wojdala, Wolczkowo (PL); Piotr A. Borys, Szczecin (PL); Ofir Benovici, Herzelia (IL); Tomer Sela, Modi'in (IL)

(73) Assignee: Avid Technology, Inc., Burlington, MA (US)

( * ) Notice: Subject to any disclaimer, the term of this patent is extended or adjusted under 35 U.S.C. 154(b) by 0 days. days.

(21) Appl. No.: 15/253,953

(22) Filed: Sep. 1, 2016

(65) Prior Publication Data

US 2018/0061130 A1 Mar. 1, 2018

(51) Int. Cl.
*G06T 19/00* (2011.01)
*H04L 29/06* (2006.01)

(52) U.S. Cl.
CPC ........ *G06T 19/006* (2013.01); *H04L 65/4069* (2013.01)

(58) Field of Classification Search
None
See application file for complete search history.

(56) References Cited

U.S. PATENT DOCUMENTS

| | | | | |
|---|---|---|---|---|
| 5,892,554 A | * | 4/1999 | DiCicco | H04N 5/272 348/584 |
| 7,305,442 B1 | * | 12/2007 | Lundy | G06Q 30/02 455/412.1 |
| 2009/0094113 A1 | * | 4/2009 | Berry | G06F 17/30017 705/14.73 |
| 2011/0321082 A1 | * | 12/2011 | Weerasinghe | H04N 21/44008 725/31 |
| 2012/0100915 A1 | * | 4/2012 | Margalit | A63F 13/61 463/31 |
| 2012/0140025 A1 | * | 6/2012 | Friedman | H04N 13/004 348/42 |
| 2016/0205341 A1 | * | 7/2016 | Hollander | G06T 7/20 375/240.08 |

OTHER PUBLICATIONS

Invictus, Avid Product Information, Avid website, https://web.archive.or/web/20160909043958/www.avid.com/products/invictus, 2016.

* cited by examiner

*Primary Examiner* — Nicholas R Wilson
(74) *Attorney, Agent, or Firm* — Oliver Strimpel

(57) ABSTRACT

In current systems, augmented reality graphics is generated at a central broadcast facility or studio where it is combined with the video that is transmitted to subscribers. By contrast, in the described system, the studio does not generate the graphics, but transmits video together with real-time metadata to the end-user set-top device. The end-user device generates the augmented reality graphics, using the metadata to determine positional and other parameters for displaying the graphics. Shifting the generation of augmented reality graphics to the consumer level facilitates end-user customization and individualized targeting of information by a broadcaster or advertiser.

18 Claims, 1 Drawing Sheet

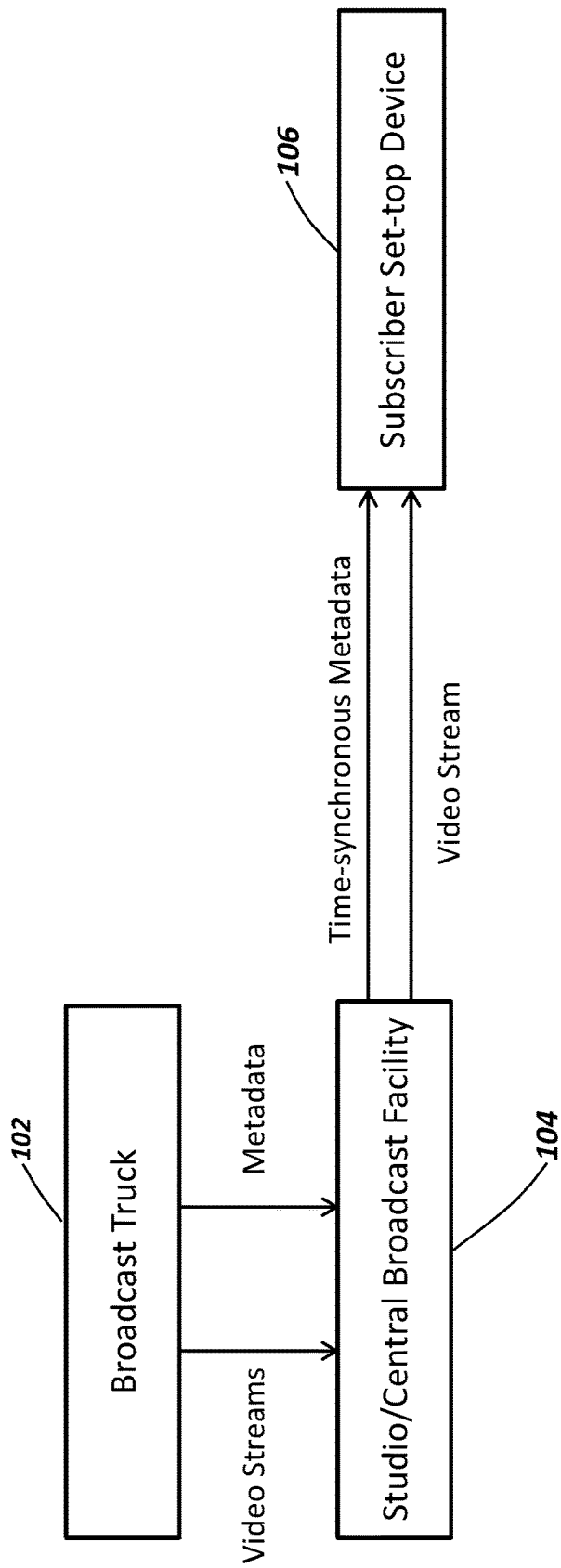

PERSONALIZED VIDEO-BASED AUGMENTED REALITY

BACKGROUND

Many television programs include augmented reality graphics that serve to highlight an element that appears in the picture, present information to the viewer, or add a synthetic element to the picture. For example, a live sports video may be augmented with graphics highlighting a particular player action, or a virtual advertisement may be added to the walls of the venue at which the sports game is being played. In current systems, a video feed together with metadata is sent from a field venue to a central studio or other broadcast facility. The central location generates the augmented reality graphics using location and other information obtained from the metadata to position the graphics appropriately. The augmented reality graphics is then combined with the video into a single video stream with the augmented reality "baked in" and is broadcast to subscribers. In some situations, the augmentation is performed at the venue, for example in a broadcast truck, and then sent in broadcast-ready form to the central studio for distribution. The result is a one-size-fits-all program, in which all viewers see the same video, superposed graphics included. With the advent of smart set-top boxes and non-traditional viewing platforms such as smartphones and tablets, viewers are seeking more control over, and interaction with their devices.

SUMMARY

In general, the methods and systems described herein involve transmitting video-related metadata to consumers so that augmented reality graphics can be generated on the user's platform, which removes the need to broadcast standard augmented reality graphics to all consumers.

In general, in one aspect, a method performed by an end-user device comprises: receiving a broadcast video stream; receiving time-based metadata that is associated with one or more video frames of the broadcast video stream to which it pertains; generating an element pertaining to the one or more video frames of the broadcast video stream, wherein the element includes an attribute that is based on the metadata; and displaying the element and the one or more video frames synchronously on a display of the end-user device.

Various embodiments include one or more of the following features. The element pertaining to the one or more video frames is an augmented reality graphical element. The time-based metadata includes a position within the one or more video frames of an object appearing in the one or more frames, and the attribute is a position within the one or more frames at which the augmented reality element is displayed. The attribute is a shape of the augmented reality graphical element. The attribute is a color of the augmented reality graphical element. The metadata includes advertising information, and the augmented reality graphical element includes a rendering of the advertising information projected onto a surface represented in the one or more frames. The advertising information is based in part on a geographical location of the end-user device. The advertising information is based in part on program viewing preferences of a user of the end-user device. The element pertaining to the one or more video frames is a graphical element representing data obtained by analyzing the one or more video frames. The analysis includes determining a position of an object that appears within the one or more video frames, and the graphical element is based in part on the position of the object. The analysis includes determining a position of two objects that appear within the one or more video frames, and the graphical element is based in part on a distance between the two objects. The analysis includes analyzing a first frame and a second frame of the broadcast video stream and determining a distance between a position of an object in the first video frame and a position of the object in the second video frame. The generating step is based in part on a preselection stored by the end-user device. The preselection was made by a user of the end-user device. The preselection includes a specification of a set of element types to be generated for display. Receiving input from a user of the end-user device, wherein the attribute is based in part on the input from the user. The time-based metadata is received as part of the broadcast video stream, and the time-based metadata is synchronized with the one or more video frames with which the time-based metadata is associated within the broadcast video stream. The time-based metadata is time-stamped and is received asynchronously from the broadcast video stream, and the end-user device uses timestamps of the metadata to associate the metadata with the one or more video frames of the broadcast video stream to which it pertains.

In general, in another aspect, a computer program product comprises: a non-transitory computer-readable medium having instructions stored thereon, the instructions, when executed on a processor of a user device, cause the user device to perform a method comprising: receiving a broadcast video stream; receiving time-based metadata that is associated with one or more video frames of the broadcast video stream to which it pertains; generating an element pertaining to the one or more video frames of the broadcast video stream, wherein the element includes an attribute that is based on the metadata; and displaying the element and the one or more video frames synchronously on a display of the user device.

In general, in yet another aspect, an end-user device comprises: a CPU; and a memory storing instructions for execution by the CPU, wherein execution of the instructions on the CPU implements a method comprising: receiving a broadcast video stream; receiving time-based metadata that is associated with one or more video frames of the broadcast video stream to which it pertains; generating an element pertaining to the one or more video frames of the broadcast video stream, wherein the element includes an attribute that is based on the metadata; and displaying the element and the one or more video frames synchronously on a display of the end-user device.

BRIEF DESCRIPTION OF THE DRAWINGS

FIG. 1 is a high level block diagram of a system for generating individually customized augmented reality graphics on a consumer platform.

DETAILED DESCRIPTION

Increasingly powerful set-top devices have the potential to provide end subscribers with new ways of interacting with the media content they receive. They also enable each subscriber to customize aspects of the viewing experience to their tastes. In particular, such devices have sufficient processing capability to generate their own augmented reality graphics in real time for adding to a live broadcast video.

The generation of real-time augmented reality graphics on an individual subscriber's device shifts the generation of augmented reality graphics downstream from a central broadcast facility to each consumer's location. Local generation of the graphics provides the ability to customize the augmented reality graphics on an individual basis for each subscriber. This involves the receipt at the consumer device of time-synchronous metadata. Such metadata pertains to the real-time content of its associated video, and is to be distinguished from non-temporal contextual metadata and from camera data. As used herein, the terms "consumer," "individual subscriber," and "end-user" are synonymous. The end-user device may be a set-top box, a mobile device such as a smartphone or tablet, a portable computer, or a workstation.

Referring to FIG. 1, broadcast truck 102 sends video that is captured from the venue to central broadcast facility 104. The cameras at the field venue also generate metadata of two types: non-time-synchronous metadata and time-synchronous metadata. The former includes non-varying camera parameters, such camera model, fixed camera parameters, field sizes, and field GPS location. The latter includes intrinsic and extrinsic camera parameters. Such parameters include time-dependent camera tracking information such as camera pointing and focal length, as well as positional information about elements within the picture. Examples of positional information include: the location of a particular player in a live team sport and the location of the ball in a live game of soccer, basketball, or other ball game. Other positional information may specify the location of surfaces within the scene, such as the walls bordering the arena of a stadium. Both kinds of metadata are also transmitted from the field venue to the central broadcast facility.

At the central broadcast facility, the incoming video may be edited and mixed down into a single video stream for transmission to individual subscribers. In a departure from current systems, the time-synchronous as well as non-time-synchronous metadata is also transmitted on to the subscribers in association with the video stream to which it pertains, where it is received by subscriber set-top device 106. The metadata may include the metadata referred to above that is transmitted from the field venue, and may also include metadata generated in the central location. Examples of the latter are camera data and object tracking data derived from analysis of the video, including pattern recognition. The metadata may be embedded in the video signal, for example in the vertical blanking interval, or the video may be broadcast in the usual manner over the air or over cable, and the metadata sent via a different means, such as via the Internet. Another alternative is to send the metadata in an uncompressed fake audio channel. When metadata is sent separately from the broadcast media, it may arrive at the end-user device at a different time from the arrival time of the media. Separate transmission of the metadata therefore requires timestamping with metadata with timecode pointing to the video frame with which is associated, thus enabling it to be synchronized with the video at the subscriber end. Thus, metadata sent via the internet or via other synchronous means will be timestamped at the studio/central broadcast facility before transmission.

By using metadata that is time-synchronized, the consumer's device is able to use that metadata as the basis for augmenting the precise frame or frames to which it pertains. For example, the metadata may represent the position of a particular play within its associated video frame so that correctly positioned graphics may be drawn around it. In another example, camera parameters that correspond to their associated frame enable the consumer device to add graphics that are accurately registered with the content of the video frame, such as by drawing an offside line on a playing field. In another example, the metadata that specifies the position of a surface within the picture is used by the set-top box to generate a virtual advertisement that appears to be displayed with the correct geometry within the live venue on the surface.

The decentralization of the graphics generation to the individual subscriber device enables the customization of the graphics to each individual subscriber. The customization may be under the control of the subscriber, or may be determined by the provider of the video broadcast. In the former case, the subscriber may be offered a set of choices that define the appearance of the augmented graphics elements. Examples of such subscriber-specific parameter selections include: a shape and color of an augmented reality element and a type of graphic deployed to indicate movement. Using soccer as an example, an augmented reality element to indicate an offside line may be drawn as a one-dimensional line painted onto the field, or it may be drawn as a two-dimensional wall that appears to rise up from the field. Or the user may choose a graphical representation of position markers or highlights. The user may decide whether to add augmented reality at all, and if so for which aspects of a program. The user may preselect certain types of graphical elements that are to be added to the received broadcast video, so that types which are not selected will not be generated or displayed. For example, a user may preselect that augmented reality should be generated only for a particular sport, or only for a particular match (e.g., a final). At a finer grain, the preselection may specify that the additional elements include particular game-related graphics. Using the soccer example again, the user may specify whether to generate an offside line, a player motion graphic, a ball trajectory, or other in-game element. In some systems the user may be able to choose whether advertising information may be displayed as augmented reality within the video.

Some of the augmented reality graphics may be under the control of the broadcast provider who may personalize the graphics for each individual subscriber based on data such as the subscriber's location and their video program watching preferences. Such data may also be used to offer targeted advertising, such as through the generation of virtual billboards on in-picture surfaces, such as a stadium wall or the playing field itself.

The time-based metadata received at the consumer device may also be used to generate non-augmented reality elements. For example, the metadata may include information about the trajectory of a ball. An application on the consumer device may then use such metadata to calculate various distances travelled by the ball, and display this as text, or as ordinary information graphics. For example, the application may determine the length of a kick by determining the distance from the position when a player kicked the ball to the position where it landed or was received by another player. A similar calculation may be performed to determine a distance travelled by a player within a specified time interval. Similarly, the device may derive the speed with which a ball or player or other object is moving within the pictured scene. The user may interactively specify the start and end point for such calculations by marking points within a frozen frame.

The video-related metadata may be exposed for use by third party application developers via an API, opening up a new ecosystem of augmented reality applications.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method performed by a user device, the method comprising:
    receiving a broadcast video stream;
    receiving time-based metadata that is associated with one or more video frames of the broadcast video stream, wherein:
        the time-based metadata defines a spatial position within the one or more video frames at which the user device is to superpose onto the one or more video frames an element generated by the user device; and
        the user device is able to display the one or more video frames of the broadcast video stream independently of the received time-based metadata;
    generating the element and superposing the element onto the one or more video frames of the broadcast video stream at the spatial position within the one or more video frames defined by the time-based metadata, wherein an attribute of the generated element is based on a preselected preference by a user of the user device; and
    displaying the one or more video frames and the superposed element on a display of the user device.

2. The method of claim 1, wherein the generated element is an augmented reality graphical element.

3. The method of claim 1, wherein the attribute is a shape of the generated element.

4. The method of claim 1, wherein the attribute is a color of the generated element.

5. The method of claim 1, wherein the metadata includes advertising information, and the generated element includes a rendering of the advertising information projected onto an object represented in the one or more video frames such that the advertising information appears to be displayed on a surface of the object.

6. The method of claim 5, wherein the advertising information is based in part on a geographical location of the user device.

7. The method of claim 5, wherein the advertising information is based in part on program viewing preferences of the user of the user device.

8. The method of claim 1, wherein the generated element represents data obtained by analyzing the one or more video frames.

9. The method of claim 8, wherein the analysis includes determining a position of an object that appears within the one or more video frames, and the generated element is based in part on the position of the object.

10. The method of claim 8, wherein the analysis includes determining a position of two objects that appear within the one or more video frames, and the generated element is based in part on a distance between the two objects.

11. The method of claim 8, wherein the analysis includes analyzing a first frame and a second frame of the broadcast video stream and determining a distance between a position of an object in the first video frame and a position of the object in the second video frame.

12. The method of claim 1 wherein the generating step is based in part on a preselection stored by the user device.

13. The method of claim 12, wherein the preselection includes a specification of a set of element types to be generated for display.

14. The method of claim 1, further comprising receiving input from the user of the user device, and wherein the attribute is based in part on the input from the user.

15. The method of claim 1, wherein the time-based metadata is received as part of the broadcast video stream, and the time-based metadata is synchronized with the one or more video frames with which the time-based metadata is associated within the broadcast video stream.

16. The method of claim 1, wherein the time-based metadata is timestamped and is received asynchronously from the broadcast video stream, and the user device uses timestamps of the metadata to associate the metadata with a corresponding one or more video frames of the broadcast video stream.

17. A computer program product comprising:
a non-transitory computer-readable medium having instructions stored thereon, the instructions, when executed on a processor of a user device, cause the user device to perform a method comprising:
receiving a broadcast video stream;
receiving time-based metadata that is associated with one or more video frames of the broadcast video stream, wherein:
the time-based metadata defines a spatial position within the one or more video frames at which the user device is to superpose onto the one or more video frames an element generated by the user device; and
the user device is able to display the one or more video frames of the broadcast video stream independently of the received time-based metadata;
generating the element and superposing the element onto the one or more video frames of the broadcast video stream at the spatial position within the one or more video frames defined by the time-based metadata, wherein an attribute of the generated element is based on a preselected preference by a user of the end-user user device; and
displaying the one or more video frames and the superposed element on a display of the user device.

18. A user device comprising:
a CPU; and
a memory storing instructions for execution by the CPU, wherein execution of the instructions on the CPU implements a method comprising:
receiving a broadcast video stream;
receiving time-based metadata that is associated with one or more video frames of the broadcast video stream, wherein:
the time-based metadata defines a spatial position within the one or more video frames at which the user device is to superpose onto the one or more video frames an element generated by the user device; and
the user device is able to display the one or more video frames of the broadcast video stream independently of the received time-based metadata;
generating the element and superposing the element onto the one or more video frames of the broadcast video stream at the spatial position within the one or more video frames defined by the time-based metadata, wherein an attribute of the generated element is based on a preselected preference by a user of the user device; and
displaying the one or more video frames and the superposed element on a display of the user device.

* * * * *